United States Patent [19]
Buchanan

[11] Patent Number: 5,716,514
[45] Date of Patent: Feb. 10, 1998

[54] FCC $NO_x$ REDUCTION BY TURBULENT/ LAMINAR THERMAL CONVERSION

[75] Inventor: John S. Buchanan, Trenton, N.J.

[73] Assignee: Mobil Oil Corporation, Fairfax, Va.

[21] Appl. No.: 521,179

[22] Filed: Aug. 30, 1995

[51] Int. Cl.$^6$ .......................... C10G 11/00; C01B 21/00; B01J 38/14
[52] U.S. Cl. .......................... 208/113; 208/120; 423/235; 502/34; 502/38; 502/49
[58] Field of Search .................. 208/113, 120; 423/235; 502/34, 38, 49

[56] References Cited

U.S. PATENT DOCUMENTS

| | | | |
|---|---|---|---|
| 4,405,587 | 9/1983 | McGill et al. | 423/235 |
| 4,519,993 | 5/1985 | McGill et al. | 423/235 |
| 5,021,144 | 6/1991 | Altrichter | 208/113 |
| 5,240,690 | 8/1993 | Tang et al. | 208/113 |
| 5,268,089 | 12/1993 | Avidan et al. | 208/113 |
| 5,372,706 | 12/1994 | Buchanan et al. | 423/235 |

Primary Examiner—Glenn Caldarola
Assistant Examiner—Walter D. Griffin
Attorney, Agent, or Firm—Robert B. Furr, Jr.; Ronald J. Cier

[57] ABSTRACT

Oxides of nitrogen ($NO_x$) emissions from an FCC regenerator are reduced by operating the regenerator in partial CO burn mode and controlled turbulent/laminar flow processing of the flue gas. Partial CO burn FCC catalyst regeneration produces flue gas with CO and $NO_x$ precursors. Air is added to a turbulent flow reactor such as a flue gas transfer line where most $NO_x$ precursors are homogeneously converted while leaving some CO unconverted. A downstream CO boiler thermally converts this unconverted CO. $NO_x$ emissions are less than would be experienced using a like amount of air injection to a conventional CO boiler.

10 Claims, 1 Drawing Sheet

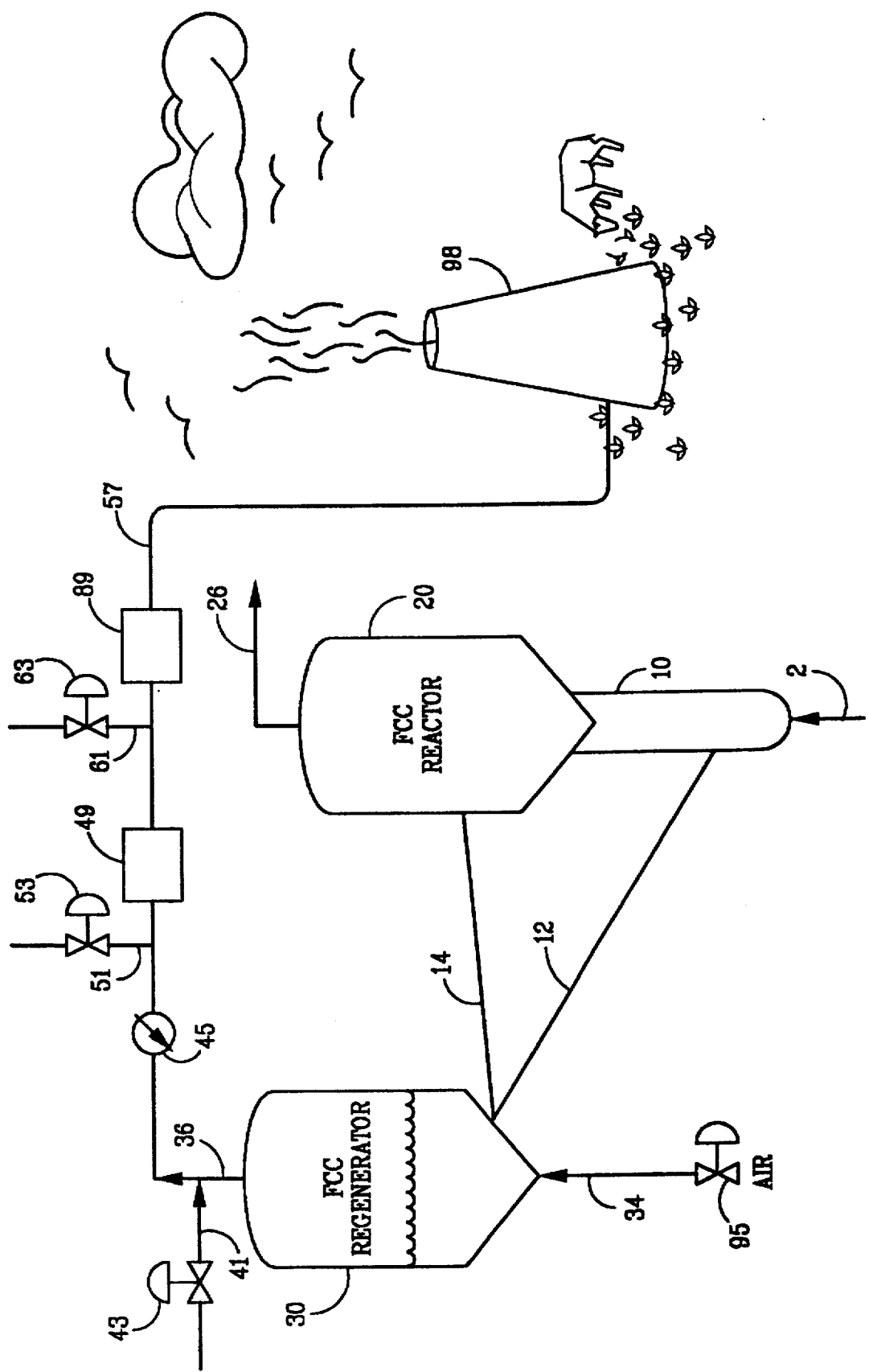

FCC NO$_x$ REDUCTION BY TURBULENT/LAMINAR THERMAL CONVERSION

BACKGROUND OF THE INVENTION

1. Field of the Invention

The invention relates to regeneration of spent catalyst from an FCC unit.

2. Description of Related Art

NO$_x$, or oxides of nitrogen, in flue gas streams from FCC regenerators is a pervasive problem. FCC units process heavy feeds containing nitrogen compounds, and some of this material is eventually converted into NO$_x$ emissions, either in the FCC regenerator (if operated in full CO burn mode) or in a downstream CO boiler (if operated in partial CO burn mode). Thus all FCC units processing nitrogen containing feeds can have a NO$_x$ emissions problem due to catalyst regeneration, but the type of regeneration employed (full or partial CO burn mode) determines whether NO$_x$ emissions appear sooner (regenerator flue gas) or later (CO boiler).

Although there may be some nitrogen fixation, or conversion of nitrogen in regenerator air to NO$_x$, most NO$_x$ emissions are believed to come from oxidation of nitrogen compounds in the feed.

Several powerful ways have been developed to deal with the problem. The approaches fall into roughly five categories:

1. Feed hydrotreating, to keep NO$_x$ precursors from the FCC unit.
2. Segregated cracking of fresh feed.
3. Process and hardware approaches which reduce the NO$_x$ formation in a regenerator in complete CO burn mode, via regenerator modifications.
4. Catalytic approaches, using a catalyst or additive which is compatible with the FCC reactor, which suppress NO$_x$ formation or catalyze its reduction in a regenerator in complete CO burn mode.
5. Stack gas cleanup methods which are isolated from the FCC process.

The FCC process will be briefly reviewed, followed by a review of the state of the art in reducing NO$_x$ emissions.

FCC PROCESS

Catalytic cracking of hydrocarbons is carried out in the absence of externally added H$_2$ in contrast to hydrocracking, in which H$_2$ is added during the cracking step. An inventory of particulate catalyst continuously cycles between a cracking reactor and a catalyst regenerator. In FCC, hydrocarbon feed contacts catalyst in a reactor at 425° C.–600° C., usually 460° C.–560° C. The hydrocarbons crack, and deposit carbonaceous hydrocarbons or coke on the catalyst. The cracked products are separated from the coked catalyst. The coked catalyst is stripped of volatiles, usually with steam, and is then regenerated. In the catalyst regenerator, the coke is burned from the catalyst with oxygen-containing gas, usually air. Coke burns off, restoring catalyst activity and heating the catalyst to, e.g., 500° C.–900° C., usually 600° C.–750° C. Flue gas formed by burning coke in the regenerator may be treated to remove particulates and convert carbon monoxide, after which the flue gas is normally discharged into the atmosphere.

Most FCC units now use zeolite-containing catalyst having high activity and selectivity. These catalysts are believed to work best when coke on catalyst after regeneration is relatively low.

Two types of FCC regenerators are commonly used, the high efficiency regenerator and the bubbling bed type.

The high efficiency regenerator mixes recycled regenerated catalyst with spent catalyst, burns much of the coke in a fast fluidized bed coke combustor, then discharges catalyst and flue gas up a dilute phase transport riser where additional coke combustion may occur and CO is afterburned to CO$_2$. These regenerators are designed for complete CO combustion and usually produce clean burned catalyst and flue gas with little CO and modest amounts of NO$_x$.

The bubbling bed regenerator maintains the catalyst as a bubbling fluidized bed, to which spent catalyst is added and from which regenerated catalyst is removed. These usually have more catalyst inventory in the regenerator because gas/catalyst contact is not as efficient in a bubbling bed as in a fast fluidized bed.

Many bubbling bed regenerators operate in complete CO combustion mode, i.e., the mole ratio of CO$_2$/CO is at least 10. Many refiners burn CO completely in the catalyst regenerator to conserve heat and to minimize air pollution.

Many refiners add a CO combustion promoter metal to the catalyst or to the regenerator. U.S. Pat. No. 2,647,860 proposed adding 0.1 to 1 weight percent chromic oxide to a cracking catalyst to promote combustion of CO. U.S. Pat. No. 3,808,121, taught using relatively large-sized particles containing CO combustion-promoting metal into a regenerator. The small-sized catalyst cycled between the cracking reactor and the catalyst regenerator while the combustion-promoting particles remain in the regenerator.

U.S. Pat. No. 4,072,600 and 4,093,535 taught use of Pt, Pd, Ir, Rh, Os, Ru and Re in cracking catalysts in concentrations of 0.01 to 50 ppm, based on total catalyst inventory. Most FCC units now use Pt CO combustion promoter. This reduces CO emissions, but usually increases nitrogen oxides (NO$_x$) in the regenerator flue gas.

It is difficult in a catalyst regenerator to burn completely coke and CO in the regenerator without increasing the NO$_x$ content of the regenerator flue gas. Many jurisdictions restrict the amount of NO$_x$ that can be in a flue gas stream discharged to the atmosphere. In response to environmental concerns, much effort has been spent on finding ways to reduce NO$_x$ emissions.

The NO$_x$ problem is acute in bubbling dense bed regenerators, perhaps due to localized high oxygen concentrations in the large bubbles of regeneration air. Even high efficiency regenerators, with better catalyst/gas contacting, produce significant amounts of NO$_x$, though usually about 50–75% of the NO$_x$ produced in a bubbling dense bed regenerator cracking a similar feed.

Much of the discussion that follows is generic to any type of regenerator while some is specific to bubbling dense bed regenerators, which have the most severe NO$_x$ problems.

FEED HYDROTREATING

Some refiners hydrotreat feed. This is usually done to meet sulfur specifications in products or a SOx limit in regenerator flue gas, rather than a NO$_x$ limitation. Hydrotreating removes some nitrogen compounds in FCC feed, and this reduces NO$_x$ emissions from the regenerator.

SEGREGATED FEED CRACKING

U.S. Pat. No. 4,985,133, Sapre et al, incorporated by reference, taught reducing NO$_x$ emissions, and improving performance in the cracking reactor, by keeping high and low nitrogen feeds segregated, and adding them to different elevations in the FCC riser.

PROCESS AND HARDWARE APPROACHES TO $NO_x$ CONTROL

Process modifications are suggested in U.S. Pat. Nos. 4,413,573 and 4,325,833, to two-and three-stage FCC regenerators, which reduce $NO_x$ emissions.

U.S. Pat. No. 4,313,848 taught countercurrent regeneration of spent FCC catalyst without backmixing minimized $NO_x$ emissions.

U.S. Pat. No. 4,309,309 taught adding fuel vapor to the upper portion of an FCC regenerator to minimize $NO_x$. Oxides of nitrogen formed in the lower portion of the regenerator were reduced by burning fuel in upper portion of the regenerator.

U.S. Pat. No. 4,542,114 taught minimizing the volume of flue gas by using oxygen rather than air in the FCC regenerator. This reduced the amount of flue gas produced.

In Green et al, U.S. Pat. No. 4,828,680, incorporated by reference, $NO_x$ emissions from an FCC unit were reduced by adding sponge coke or coal to the circulating inventory of cracking catalyst. The coke absorbed metals in the feed and reduced $NO_x$ emissions. Many refiners are reluctant to add coal or coke to their FCC units, as such materials burn and increase heat release in the regenerator.

$DENO_x$ WITH COKE

U.S. Pat. No. 4,991,521 Green and Yan used coke on spent FCC catalyst to reduce $NO_x$ emissions. Flue gas from a second stage of regeneration contacted coked catalyst in a first stage. Although reducing $NO_x$ emissions this approach is not readily adaptable to existing units.

$DENO_x$ WITH REDUCING ATMOSPHERES

Another approach to reducing $NO_x$ emissions is to create a reducing atmosphere in part of the regenerator by segregating the CO combustion promoter. U.S. Pat. Nos. 4,812,430 and 4,812,431 used as CO combustion promoter Pt on a support which "floated" or segregated in the regenerator. Large, hollow, floating spheres gave a sharp segregation of CO combustion promoter in the regenerator and this helped reduce $NO_x$ emissions.

CATALYTIC APPROACHES TO $NO_x$ CONTROL

The work that follows is generally directed at catalysts which burn CO but do not promote formation of $NO_x$.

U.S. Pat. Nos. 4,300,997 and 4,350,615, use Pd-Ru CO-combustion promoter. The bi-metallic CO combustion promoter is reported to do an adequate job of converting CO while minimizing $NO_x$ formation.

U.S. Pat. No. 4,199,435 suggests steaming metallic CO combustion promoter to decrease $NO_x$ formation without impairing too much the CO combustion activity of the promoter.

U.S. Pat. No. 4,235,704 suggests that in complete CO combustion mode too much CO combustion promoter causes $NO_x$ formation in FCC. Monitoring the $NO_x$ content of the flue gas and adjusting the amount of CO combustion promoter in the regenerator based on $NO_x$ in the flue gas is suggested. As an alternative to adding less Pt the patentee suggests deactivating Pt in place by adding lead, antimony, arsenic, tin or bismuth.

U.S. Pat. No. 5,002,654, Chin, incorporated by reference, taught a zinc based additive for reducing $NO_x$. Relatively small amounts of zinc oxides impregnated on a separate support with little cracking activity produced an additive circulated with the FCC E-cat and reduced $NO_x$ emissions.

U.S. Pat. No. 4,988,432 Chin, incorporated by reference, taught an antimony based additive for reducing $NO_x$.

Many refiners are reluctant to add metals to their catalyst out of environmental concerns. Zinc may vaporize under conditions experienced in some FCC units. Antimony addition may make disposal of spent catalyst more difficult.

Such additives add to the cost of the FCC process, may dilute the E-cat and may not be as effective as desired.

In addition to catalytic approaches, there are hybrid approaches involving catalyst and process modifications.

U.S. Pat. No. 5,021,144, Altrichter, taught operating the regenerator in partial CO burn mode with excess Pt on E-cat. Adding excess Pt reduced $NO_x$ in the CO boiler stack gas. This is similar to a refiner operating in partial CO burn mode with excess Pt to ensure stable operation.

U.S. Pat. No. 5,268,089, Avidan et. al, incorporated by reference, taught reducing $NO_x$ emissions by running the FCC regenerator between full and partial CO burn mode with combustion of CO containing flue gas in a downstream CO boiler. Although a CO boiler was preferred the patent mentioned use of Pt gauze, or honeycombs coated with Pt or similar CO combustion promoter to reduce CO emissions. Avidan's "uncomfortable" mode of regenerator operation made it possible to burn $NO_x$ precursors to $N_2$ in the generally reducing atmosphere of the FCC regenerator. The flue gas from the CO boiler had less $NO_x$ than if the regenerator were run in full CO burn mode or partial CO burn mode with a CO boiler.

The '089 approach provides a good way to reduce $NO_x$ emissions, but some refiners want even greater reductions, or are reluctant to operate their FCC regenerator in such an "uncomfortable" region which is difficult to control. Some may simply want the ability to operate their FCC regenerators solidly in the partial CO burn region, which makes the FCC unit as a whole much more flexible.

Considerable effort has also been spent on downstream treatment of FCC flue gas. This area will be reviewed next.

STACK GAS TREATMENT

First it should be mentioned that FCC regenerators present special problems. FCC regenerator flue gas will usually have large amounts, from 4 to 12 mole %, of steam, and significant amounts of sulfur compounds. The FCC environment changes constantly, and relative amounts of $CO/O_2$ can and do change rapidly.

The FCC unit may yield reduced nitrogen species such as ammonia or oxidized nitrogen species such as $NO_x$. In some units, especially bubbling dense bed regenerators, both oxidized and reduced nitrogen contaminant compounds are present at the same time. It is as if some portions of the regenerator have an oxidizing atmosphere, and other portions have a reducing atmosphere.

Bubbling bed regenerators may have reducing atmospheres where spent catalyst is added, and oxidizing atmospheres in the large bubbles of regeneration air passing through the catalyst bed. Even if air distribution is perfectly synchronized with spent catalyst addition at the start-up of a unit, something will usually change during the course of normal operation which upset the balance of the unit. Typical upsets include changes in feed rate and composition, air distribution nozzles in the regenerator which break off, and slide valves and equipment that erode over the course of the 1-3 year run length of the FCC unit operation.

Any process used for FCC regenerator flue gas must be able to deal with the poisons and contaminants, such as sulfur compounds, which are inherent in FCC operation. The process must be robust and tolerate great changes in flue gas composition. Ideally, the process should be able to oxidize reduced nitrogen species and also have the capability to reduce oxidized nitrogen species which may be present.

Stack gas treatments have been developed which reduce $NO_x$ in flue gas by reaction with $NH_3$. $NH_3$ is a selective reducing agent which does not react rapidly with the excess oxygen which may be present in the flue gas. Two types of $NH_3$ processes have evolved, thermal and catalytic.

Thermal processes, e.g. the Exxon Thermal DeNO$_x$ process, operate as homogeneous gas-phase processes at 1550°–1900° F. More details are disclosed by Lyon, R. K., Int. J. Chem. Kinet., 3, 315, 1976, incorporated by reference.

Catalytic systems have been developed which operate at lower temperatures, typically at 300°–850° F.

U.S. Pat. Nos. 4,521,389 and 4,434,147 disclose adding $NH_3$ to flue gas to reduce catalytically the $NO_x$ to nitrogen.

U.S. Pat. No. 5,015,362, Chin, incorporated by reference, taught contacting flue gas with sponge coke and a catalyst promoting reduction of $NO_x$ around such carbonaceous substances.

None of the approaches described is the perfect solution.

Feed pretreatment is expensive, and usually only justified for sulfur removal. Segregated feed cracking helps but requires segregated high and low nitrogen feeds.

Multi-stage or countercurrent regenerators reduce $NO_x$ but require extensive rebuilding of the FCC regenerator.

Catalytic approaches, e.g., adding lead or antimony, to degrade Pt, help some but may not meet stringent $NO_x$ emissions limits set by local governing bodies. Stack gas cleanup is powerful, but the capital and operating costs are high.

The approach disclosed in U.S. Pat. No. 5,268,089 gave a good way to reduce $NO_x$ emissions with little additional cost, but a refiner did not have as much flexibility in operating the FCC unit and this approach did not always reduce $NO_x$ to the extent desired. Of particular concern to many refiners was the difficulty of maintaining the regenerator "on the brink"—an uncomfortable operation of the FCC regenerator. While the $NO_x$ reductions are substantial, the unit is hard to control because classical control methods no longer work. Adding more air might cool the regenerator (by dilution) or heat it (if the regenerator was somewhat in partial combustion mode).

I wanted a better way to reduce $NO_x$ emissions associated with FCC regenerators. I liked the approach disclosed in '089, but wanted more $NO_x$ reduction and wanted to give refiners more flexibility in operating their units. I also wanted to shift at least some heat generation out of the FCC regenerator to a downstream CO boiler so that heavier feeds could be cracked in the FCC unit.

I very much wanted to eliminate or at least reduce the need to inject ammonia or ammonia precursors such as urea into FCC flue gas streams, as these represented another pollutant if something went wrong with the injection system. I also wanted to develop a $NO_x$ control process for FCC regenerator flue gas streams which reduced or eliminated the reliance on catalyst to reduce $NO_x$, and which did not require significant capital or operating expense, such as is involved in the high temperature thermal deNO$_x$ processes.

I discovered, almost by accident, a way to operate the FCC regenerator solidly in partial CO burn mode and eliminate most $NO_x$ precursors using thermal processing, without catalyst of any kind. I learned that flue gas with at least 2 mole % CO and containing large amounts of $NO_x$ precursors could be burned at high velocity to selectively oxidize $NO_x$ precursors, leaving most of the CO unconverted. Such $NO_x$ precursor oxidation as occurred seemed to be selective for nitrogen rather than $NO_x$ when large amounts of CO were present, and the gas stream moved along at a high velocity. Perhaps $NO_x$ was forming and being quickly reduced by unconverted CO.

This puzzling selectivity of oxygen for $NO_x$ precursors in high velocity flue gas streams provided the key to an efficient low cost $NO_x$ conversion process.

By operating the regenerator deep in partial CO burn mode the regenerator could be reliably operated. When the regenerator is deep in partial CO burn mode, the plant operators know it will get hotter in the regenerator if more air is added. They also know that the flue gas will contain copious amounts of CO, at least 2 mole % is preferred.

This regenerator flue gas, in fully developed turbulent flow, permits substoichiometric oxidation of $NO_x$ precursors with air or oxygen containing gas. This is very different from what occurs in a conventional CO boiler, where much of the oxygen/flue gas contact occurs in laminar flow. Laminar flow allows localized regions of high oxygen concentration, which forms large amounts of $NO_x$ when $NO_x$ precursors are converted. Fully developed flow, such as high velocity flow found in flue gas transfer lines, allows selective conversion of $NO_x$ precursors to nitrogen, or perhaps to $NO_x$ which is then converted by the CO already in the transfer line.

This allows refiners with CO boilers to continue to use them, but to reduce $NO_x$ emissions associated with them.

BRIEF SUMMARY OF THE INVENTION

Accordingly the present invention provides a catalytic cracking process for cracking a nitrogen containing hydrocarbon feed comprising cracking said feed in a cracking reactor with a source of regenerated cracking catalyst to produce catalytically cracked products which are removed as a product and spent catalyst containing nitrogen containing coke regenerating said spent catalyst in a catalyst regenerator by contact with a controlled amount of air or oxygen-containing regeneration gas at regeneration conditions to produce regenerated catalyst which is recycled to said cracking reactor and regenerator flue gas; removing a regenerator flue gas stream comprising volatilized $NO_x$ precursors, at least 1 mole % carbon monoxide and more carbon monoxide than oxygen, molar basis; adding air or oxygen containing gas to regenerator flue gas flowing in a transfer line turbulent flow reactor at a vapor velocity above 15 m/sec to produce oxygen enriched flue gas in turbulent flow; homogeneously converting at least 25 mole % of volatilized $NO_x$ precursors, but less than 75 mole % of said CO, in said oxygen enriched flue gas in said turbulent flow reactor to produce homogeneously converted flue gas containing CO and a reduced content of volatilized $NO_x$ precursors; and burning said homogeneously converted flue gas in a CO boiler operating at CO combustion conditions including the injection of a stoichiometric excess of oxygen or oxygen containing gas and a vapor velocity lower than said vapor velocity in said turbulent flow reactor to produce product gas with less than 0.5 mole % CO, more oxygen than CO, and a reduced $NO_x$ content as compared to the $NO_x$ content of a like regenerator flue gas burned in a CO boiler to a like CO and oxygen content.

Other embodiments relate to preferred process conditions.

BRIEF DESCRIPTION OF THE DRAWING

FIG. 1 shows a simplified process flow diagram of an FCC unit with a transfer line flue gas $NO_x$ precursor converter and a CO boiler.

DETAILED DESCRIPTION

The present invention is ideal for use with a catalytic cracking process. This process is reviewed with a review of the FIGURE, which can be conventional save for air or oxygen injection into flue gas line 36.

A heavy, nitrogen containing feed is charged via line 2 to riser reactor 10. Hot regenerated catalyst removed from the regenerator via line 12 vaporizes fresh feed in the base of the riser reactor, and cracks the feed. Cracked products and spent catalyst are discharged into vessel 20, and separated. Spent catalyst is stripped in a stripping means not shown in the base of vessel 20, then stripped catalyst is charged via line 14 to regenerator 30. Cracked products are removed from vessel 20 via line 26 and charged to an FCC main column, not shown.

Spent catalyst is maintained as a bubbling, dense phase fluidized bed in vessel 30. Regeneration gas, almost always air, sometimes enriched with oxygen, is added via line 34 to the base of the regenerator. Air flow is controlled by flow control valve 95. Regenerated catalyst is removed via line 12 and recycled to the base of the riser reactor. Flue gas is removed from the regenerator via line 36.

Much of the process and equipment recited above are those used in conventional FCC regenerators. Many FCC regenerators use such bubbling bed regenerators, which have more severe $NO_x$ emissions characteristics than high efficiency regenerators. Both types (bubbling fluid bed and fast fluid bed or high efficiency) will benefit from the practice of the present invention, which will now be reviewed.

Flue gas containing at least 2 mole % CO as well as HCN, $NH_3$ and the like is removed from the FCC regenerator via line 36. Significant amounts, preferably most, of the $NO_x$ precursors are homogeneously converted in transfer line 36, by air addition via line 41 and control valve 43. Although most of the $NO_x$ precursors are converted in the transfer line, preferably in fully developed turbulent flow, most of the CO is not converted, leaving at least 1 mole % CO to be dealt with in a conventional CO boiler, vessel 49.

CO boiler 49 thermally converts the remaining CO and most of the HCN and $NH_3$ present. HCN and $NH_3$ which survive turbulent, substoichiometric conversion in the transfer line will be burned in the CO boiler and form $NO_x$.

Air, or oxygen, or oxygen enriched air or oxygen enriched inert gas for homogeneous conversion may occur immediately downstream of the regenerator via line 41 or somewhat upstream of the CO boiler. The exact distance upstream is usually set by local site constraints and the amount of $NO_x$ removal desired. Ideally, air or oxygen containing gas injection occurs just downstream of the FCC regenerator, or downstream of any third stage separators or other equipment that might be damaged by high temperature.

The injection point should be upstream enough from the CO boiler to provide enough residence time at the temperatures experienced in the flue gas line to oxidize the $NO_x$ precursors, perhaps form some $NO_x$, and ideally have some of the formed $NO_x$ reduced with native CO to nitrogen. In most FCC units, this will require from 0.3 to 0.6 seconds of residence time in the transfer line, but high temperature units, or those units which do not have much of a $NO_x$ problem may achieve sufficient $NO_x$ precursor conversion in as little as 0.1 seconds. For many units 1 second of transfer line residence time will be sufficient. There is no upper limit on residence time, and longer residence times will allow some reduction of formed $NO_x$ by reaction with CO.

Vessel 49 usually has heat exchange tubes for making steam, not shown. The CO boiler may be in one stage, or two stages, e.g., a second stage CO boiler 89 may be provided, with additional air added via line 61 and control valve 63. A flue gas is then discharged via line 57 to stack 98.

Refiners have used staged CO combustion in the past to reduce $NO_x$ emissions. The reason they thought this worked was generally because heat removal in each stage, and a lower overall temperature and reduced flame temperature at each point of air injection, were believed to reduce $NO_x$ emissions. Probably they observed some selective conversion of $NO_x$ precursors, similar to that occurring in the turbulent transfer line in portions of the equipment. Gas velocities in CO boilers are lower, and gas maldistributions are much greater than in transfer lines, so only limited $NO_x$ reduction will occur in a 2-stage CO boiler.

Much conventional equipment, third stage separators to remove traces of particulates, power recovery turbines, and waste heat boilers, are omitted. There will frequently be some waste heat recovery means, not shown, downstream of the CO conversion means, and there may be a power recovery turbine as well. These are preferred but conventional.

CONTROL METHODS

The process is easy to control using conventional methods. Of primary importance, the regenerator is easy to control. Control methods to keep FCC regenerators solidly in partial CO burn mode were developed 50 years ago, and perfected in using regenerator differential temperature to control the regenerator air rate. Thus a thermocouple in the regenerator dilute phase, preferably generating a differential temperature against a thermocouple in the regenerator catalyst bed, measures afterburning. When afterburning, or conversion of CO to $CO_2$ occurs, it signals the air blower control valve to add less regenerator air, reducing afterburning and ensuring the presence of large amounts of CO in the regenerator flue gas.

The air addition to the transfer line can be controlled using oxygen or CO sensors, or delta T. As in the case of FCC regenerators, use of differential temperature to control transfer line air addition is preferred because it is so simple and reliable and operators are comfortable with it.

Other control methods, involving flue gas analyzer controllers, feed forward computer control models and the like may be used, but are not necessary.

Although the present invention is useful for both moving bed and fluidized bed catalytic cracking units, the discussion that follows is directed to FCC units which are the state of the art.

FCC FEED

Any conventional FCC feed can be used. The process of the present invention is good for processing nitrogenous charge stocks, those having more than 500 ppm total nitrogen compounds, and especially useful in processing stocks containing high levels of nitrogen compounds, e.g., having more than 1000 wt ppm total nitrogen compounds.

The feeds may range from the typical, such as petroleum distillates or residual stocks, either virgin or partially refined, to the atypical, such as coal oils and shale oils. The feed frequently contains recycled hydrocarbons, light and heavy cycle oils which have already been subjected to cracking.

Preferred feeds are gas oils, vacuum gas oils, atmospheric resids, and vacuum resids. The invention is most useful with feeds having an initial boiling point above about 650° F.

Fortuitously, the worst feeds in terms of regenerator heat load, frequently have the most nitrogen compounds. These are the same feeds where it is most beneficial to shift some of the burning duty out of the FCC regenerator, to a downstream CO boiler.

FCC CATALYST

Commercially available FCC catalysts may be used. The catalyst preferably contains relatively large amounts of large pore zeolite for maximum effectiveness, but such catalysts are readily available. The process will work with amorphous catalyst, but few modern FCC units use amorphous catalyst.

Preferred catalysts contain at least 10 wt % large pore zeolite in a porous refractory matrix such as silica-alumina, clay, or the like. The zeolite content is preferably higher and usually will be at least 20 wt %. For best results the catalyst should contain from 30 to 60 wt % large pore zeolite.

All zeolite contents discussed herein refer to the zeolite content of the makeup catalyst, rather than the zeolite content of the equilibrium catalyst, or E-Cat. Much crystallinity is lost in the weeks and months that the catalyst spends in the harsh, steam filled environment of modern FCC regenerators, so the equilibrium catalyst will contain a much lower zeolite content by classical analytic methods. Most refiners usually refer to the zeolite content of their makeup catalyst, and the MAT (Modified Activity Test) or FAI (Fluidized Activity Index) of their equilibrium catalyst, and this specification follows this naming convention.

Conventional zeolites such as X and Y zeolites, or aluminum deficient forms of these zeolites such as dealuminized Y (DEAL Y), ultrastable Y (USY) and ultrahydrophobic Y (UHP Y) may be used as the large pore cracking catalyst. The zeolites may be stabilized with Rare Earths, e.g., 0.1 to 10 wt % RE.

Relatively high silica zeolite containing catalysts are preferred. Catalysts containing 20–60% USY or rare earth USY (REUSY) are especially preferred.

The catalyst inventory may contain one or more additives, present as separate additive particles, or mixed in with each particle of the cracking catalyst. Additives can be added to enhance octane (medium pore size zeolites, sometimes referred to as shape selective zeolites, i.e., those having a Constraint Index of 1–12, and typified by ZSM-5, and other materials having a similar crystal structure). Other additives which may be used include CO combustion promoters and SOx removal additives, each discussed at greater length hereafter.

CO COMBUSTION PROMOTER

Use of a CO combustion promoter in the regenerator is not essential for the practice of the present invention, however, some may be present. These are well-known.

U.S. Pat. Nos. 4,072,600 and 4,235,754, incorporated by reference, teach operating an FCC regenerator with 0.01 to 100 ppm Pt. Good results are obtained with 0.1 to 10 wt. ppm platinum on the catalyst. It is preferred to operate with just enough CO combustion additive to control afterburning. Conventional procedures can be used to determine if enough promoter is present. In most refineries, afterburning shows up as a 30° F., 50° F. or 75° F. temperature increase from the catalyst bed to the cyclones above the bed, so sufficient promoter may be added so no more afterburning than this occurs.

SOx ADDITIVES

Additives may be used to adsorb SOx. These are believed to be various forms of alumina, rare-earth oxides, and alkaline earth oxides, containing minor amounts of Pt, on the order of 0.1 to 2 ppm Pt. Additives are available from several catalyst suppliers, such as Davison's "R" or Katalistiks International, Inc.'s "DESOX."

The FCC catalyst composition, per se, forms no part of the present invention.

FCC REACTOR CONDITIONS

The reactor operation will be conventional all riser cracking FCC, as disclosed in U.S. Pat. No. 4,421,636, incorporated by reference. Typical riser cracking reaction conditions include catalyst/oil weight ratios of 0.5:1 to 15:1 and preferably 3:1 to 8:1, and a catalyst contact time of 0.1–50 seconds, preferably 0.5 to 10 seconds, and most preferably 0.75 to 5 seconds, and riser top temperatures of 900 to about 1100, preferably 950° to 1050° F.

It is important to have good mixing of feed with catalyst in the base of the riser reactor, using conventional techniques such as adding large amounts of atomizing steam, use of multiple nozzles, use of atomizing nozzles and similar technology. The Atomax nozzle, available from the M. W. Kellogg Co, is preferred. Details about an excellent nozzle are disclosed in U.S. Pat. Nos. 5,289,976 and 5,306,418 which are incorporated by reference.

It is preferred, but not essential, to have a riser catalyst acceleration zone in the base of the riser.

It is preferred, but not essential, for the riser reactor to discharge into a closed cyclone system for rapid separation of cracked products from spent catalyst. A closed cyclone system is disclosed in U.S. Pat. No. 4,502,947 to Haddad et al, incorporated by reference.

It is preferred but not essential, to strip rapidly the catalyst as it exits the riser and upstream of the catalyst stripper. Stripper cyclones disclosed in U.S. Pat. No. 4,173,527, Schatz and Heffley, incorporated by reference, may be used.

It is preferred, but not essential, to use a hot catalyst stripper. Hot strippers heat spent catalyst by adding hot, regenerated catalyst to spent catalyst. A hot stripper is shown in U.S. Pat. No. 3,821,103, Owen et al, incorporated by reference. After hot stripping, a catalyst cooler may cool heated catalyst before it is sent to the regenerator. A preferred hot stripper and catalyst cooler is shown in U.S. Pat. No. 4,820,404, Owen, incorporated by reference.

Conventional FCC steam stripping conditions can be used, with the spent catalyst having essentially the same temperature as the riser outlet, and with 0.5 to 5% stripping gas, preferably steam, added to strip spent catalyst.

The FCC reactor and stripper conditions, per se, can be conventional.

CATALYST REGENERATION

The process and apparatus of the present invention can be used with bubbling dense bed FCC regenerators or high efficiency regenerators. Bubbling bed regenerators will be considered first.

BUBBLING BED CATALYST REGENERATORS

In these regenerators much of the regeneration gas, usually air, passes through the bed in the form of bubbles. These pass through the bed, but contact it poorly.

These units operate with large amounts of catalyst. The bubbling bed regenerators are not very efficient at burning coke so a large catalyst inventory and long residence time in the regenerator are needed to produce clean burned catalyst.

The carbon levels on regenerated catalyst can be conventional, typically less than 0.3 wt % coke, preferably less than 0.15 wt % coke, and most preferably even less. By coke is meant not only carbon, but minor amounts of hydrogen associated with the coke, and perhaps even very minor amounts of unstripped heavy hydrocarbons which remain on catalyst. Expressed as wt % carbon, the numbers are essentially the same, but 5 to 10% less.

Although the carbon on regenerated catalyst can be the same as that produced by conventional FCC regenerators, the flue gas composition may range from conventional partial CO burn with large amounts of CO to flue gas with significant amounts of both CO and oxidized nitrogen species. Thus operation may range from deep in partial CO burn to something which is still partial CO burn in that there is more than 1% CO present but contains some $NO_x$ as well. There should always be enough CO present in the flue gas so that the FCC regenerator may be reliably controlled using control techniques associated with partial CO combustion, e.g. use of afterburning in the regenerator to control regenerator air rate.

Strictly speaking, the CO content could be disregarded if sufficient resources are devoted to analyzing the $NO_x$ precursors directly, e.g., HCN. It would also be possible to run oxygen and carbon balances, and develop some sort of feed forward model which might be used to calculate some property of flue gas or of regenerator operation which would yield the same information in terms of controlling the unit as measuring the CO content of the regenerator flue gas. In most refineries this is neither practical nor necessary as the CO content of the flue gas is a sensitive indicator of the $NO_x$ precursors generated by a particular regenerator processing a particular feed.

In practice, the CO content of the flue gas will always exceed the oxygen content, for a regenerator operating in partial CO burn. Preferably the $CO:O_2$ molar ratio is above 2:1, and more preferably at least 3:1, 4:1, 5:1, 10:1 or higher. In many FCC regenerators, there will be orders of magnitude more CO than oxygen, because the oxygen will be substantially completely consumed in the regenerator.

The CO content of flue gas exiting the FCC regenerator should be at least 2 mole %, but preferably is at least 2.5 to 3.0 mole % CO. The process works well with large amounts of CO, such as 3–10 mole % CO. This is well within the normal limits of FCC regenerators in partial CO burn mode.

Turbulent $NO_x$ precursor conversion tolerates very well the presence of large amounts of CO, and indeed is believed to require the presence of CO. While some CO is converted, preferably less than ½ of the CO present in the flue gas from the FCC regenerator is converted.

It is important that turbulent conversion convert at least a majority, and preferably at least 80 to 90% of the $NO_x$ precursors present in the flue gas from the FCC regenerator. This ensures that the gas charged to the CO boiler will, after burning in the CO boiler, not contain excessive amounts of $NO_x$.

Temperatures in the regenerator can be similar to conventional regenerators in complete CO combustion mode. Much of the coke on catalyst may be burned to form $CO_2$ rather than CO. This complete CO combustion will increase heat release in the regenerator and tend to increase regenerator temperature. Regenerator temperatures can be reduced if the regenerator shifts deeper into partial CO burn mode, deferring much heat release until the CO boiler or the transfer line.

Catalyst coolers, or some other means for heat removal from the regenerator, can also be used to cool the regenerator. Torch oil or other fuel can be added to the regenerator to make it run hotter, if desired.

FAST FLUIDIZED BED REGENERATORS

This process may also be used with high efficiency regenerators (H.E.R.), with a fast fluidized bed coke combustor, dilute phase transport riser, and second bed to collect regenerated catalyst. It will be necessary to operate these in partial CO burn mode to make CO specifications.

H.E.R.'s inherently make excellent use of regeneration air. Most operate with 1 or 2 mole % $O_2$ or more in the flue gas when in complete CO burn mode. When in partial CO burn mode most operate with little excess oxygen, usually in the ppm range, always less than ½oth %. For HER's, significant reductions in the amount of air added may be necessary to produce a flue gas with the correct $CO/O_2$ ratio. Reducing or eliminating CO combustion promoter may be necessary to generate a flue gas with twice as much CO as oxygen.

Although most regenerators are controlled primarily by adjusting the amount of regeneration air added, other equivalent control schemes are available which keep the air constant and change some other condition. Constant air rate, with changes in feed rate changing the coke yield, is an acceptable way to modify regenerator operation. Constant air, with variable feed preheat, or variable regenerator air preheat, are also acceptable. Finally, catalyst coolers can be used to remove heat from a unit. If a unit is not generating enough coke to stay in heat balance, torch oil, or some other fuel may be burned in the regenerator.

Up to this point in the FCC process, through the regenerator flue gas, the operation can be within the limits of conventional operation. Usually the refiner will operate the regenerator solidly in partial CO burn mode, which is highly conventional. Other refiners will operate with less CO in the regenerator flue gas, but control regenerator operation so the CO content is at least twice that of the oxygen content, molar basis.

This type of regenerator operation provides a proper foundation for the practice of catalytic, post-regenerator conversion of $NO_x$ precursors, discussed hereafter.

TURBULENT $NO_x$ PRECURSOR CONVERSION

This is a simple thermal process, which operates with no catalyst. High temperature, time and a high Reynolds number create conditions where simple air or oxygen injection can selectively convert trace amounts of HCN and $NH_3$ even in the presence of large amounts of CO. This could be termed a special type of homogeneous conversion.

The temperatures of typical FCC flue gas streams will be adequate, though conventional means may be used to increase or decrease temperatures if desired.

Typical temperatures include 1100° F. to 1800° F., preferably 1200° to 1600° F., most preferably 1250° to 1450° F. Higher temperatures increase conversion, so preferably the flue gas line is not cooled. If local metallurgical limits cause a problem some steam injection may be used intermittently or continuously to cool the flue gas line.

Residence time should be sufficient to permit the desired reactions to take place. In general, the minimum required residence time will decrease as temperature increases. For instance, at 1400° F., the gas residence time calculated at process conditions is preferably at least 0.4 to 0.8 seconds.

The process works better as temperatures increase. Some refiners may wish to take advantage of this and run their regenerators deep in partial CO burn mode to produce large amounts of CO. This CO rich gas has a high flame temperature even when limited amounts of air or oxygen are added. Thus the CO rich FCC regenerator flue gas stream represents a heat source (by burning some of the CO present) and a source of reducing reactant (unreacted CO will reduce formed $NO_x$).

As CO levels increase it may be necessary to add more oxygen as some competition for oxygen may occur at very high CO levels, or where poor initial dispersion of oxygen into the flue gas results in localized consumption of much of the injected oxygen or air.

The process not only tolerates, but seems to be promoted by, the presence of large amounts of steam. Steam is always present in FCC regenerator flue gas. Most of it come either from entrained stripping steam, or is formed as water of combustion when hydrogen rich hydrocarbons burn in the regenerator. Steam partial pressures may range from 3–5 psia or higher, depending on stripping effectiveness.

Steam is detrimental for many catalysts, either in terms of catalyst selectivity or stability or both, so it is beneficial to have a process which does not require catalyst and which tolerates large amounts of steam.

To summarize, there is no upper limit on either temperature or CO concentration entering the homogeneous conversion zone. These upper limits are well within the normal operating limits of FCC regenerators operating in partial CO combustion mode.

There is no upper limit on gas residence time in the turbulent conversion zone. There is a minimum time set by that combination of time and temperature which achieves the desired conversion. There is no upper limit on time, and more gas residence time is believed to increase conversion of produced $NO_x$ due to reactions with CO.

A good way to control the addition of air into the transfer line is to measure delta T from the regenerator flue gas line to a point downstream of the air injection point. In many FCC regenerator flue gas streams, the addition of 0.5 mole % oxygen, to burn 1 mole % CO, will give a temperature rise of about 160° F. Thus if the flue gas contains more than 2 mole % CO, the refiner could add enough air to give from 50 to 500° F. of "afterburning" in the flue gas line, preferably from 100° to 300° F., and most preferably at least 150° to 180° F. of afterburning, but less than 260° to 300° F. of afterburning.

Expressed in terms of oxygen addition, refiners may add enough oxygen to equal from 0.2 to 2 mole % oxygen, preferably from 0.3 to 1.5 mole % oxygen, and most preferably from 0.5 to 1 mole % oxygen.

The flow in most gas streams in transfer lines or flue gas lines in refineries is usually above 50 fps. In many refineries the gas velocity is from 60 to 150 fps. For a typical transfer line diameter of 12 to 36", an FCC regenerator flue gas stream at 1400° F., 2 atm. will have a NRe ranging from about 50,000 to 1,000,000. Typical flue gas lines from FCC regenerators will have an NRe of 100,000 to 500,000, with most in the range of 200,000 to 400,000.

LAMINAR FLOW CO BOILER

The last essential step of the process of the present invention is burning the last of the CO present in the gas stream from the turbulent flow reactor in a downstream CO boiler, which will usually have large laminar flow regions. Any $NO_x$ precursors burned in the CO boiler will be non-selectively converted, yielding relatively large amounts of $NO_x$, as CO boilers have done for decades.

One reason a CO boiler is used, despite its poor selectivity, is that this gas stream contains too much CO to permit its discharge to the atmosphere. The CO content also represents a significant amount of potential energy, which can be recovered if the CO containing gas is burned in a vessel or device designed to recover this energy in the form of steam or other high grade heat.

The flue gas discharged from the CO boiler will have low levels of both $NO_x$ and CO. The $NO_x$ and CO levels should be below 100 ppm. Preferably the $NO_x$ and CO levels are each below 50 ppm.

If the stream is dry roughly ½ of the ammonia is converted to NO. If my process is conducted at 1400° F., then some steam is essential for efficient ammonia conversion and to suppress NO formation. FCC regenerator flue gas usually has more than 8 mole % steam, so significant $NO_x$ emissions reductions can be achieved by turbulent, substoichiometric combustion of ammonia at temperatures near those of conventional FCC regenerators.

Higher temperatures, circa 1600°–1800° F., improve both $NO_x$ precursor conversion and selectivity. High temperatures can easily be achieved in the flue gas line by operating the regenerator deeper in partial CO burn mode, and letting CO combustion heat the flue gas. Preferably air addition is staged in the flue gas line, to promote the maximum amount of substoichiometric combustion and delay some $NO_x$ precursor conversion until higher temperatures are produced in the transfer line. Higher temperatures reduce the importance of steam, though steam is still believed beneficial.

Thus the tests run at 1800° F. show that substoichiometric conversion of $NH_3$ in a gas stream containing 2 mole % CO can achieve a modest conversion of a dry gas stream, and very efficient conversion if the stream contains 8 mole % water. The 200 ppm $NH_3$ was completely converted, and only 20 ppm NO was formed. Had such a stream been burned in a normal CO boiler, the NO yield would be around 100 ppm, so significant reductions in NO emissions were achieved.

My process lends itself to several refinery applications. A refiner with a CO boiler faced with the prospect of putting in expensive, and troublesome, selective catalytic reduction units on an FCC should first consider injecting a modest amount of air into the flue gas line from the FCC unit, at a point at least 0.5 seconds upstream of the CO boiler. Many refineries have sample probe lines which could be used to inject air via a simple air sparger. There is almost no capital cost associated with a simple piece of pipe with holes drilled in it. There is no operating cost, as the total amount of air added is the same as before, with the difference being that some air is added upstream of the CO boiler.

Although there is almost no capital cost, and no operating cost, there is a substantial reduction in $NO_x$ formation. This allows refiners near a $NO_x$ emissions limit to reduce their $NO_x$ emissions without incurring the substantial capital costs associated with an SCR, and without requiring ammonia injection. If a refiner must put in SCR units, the practice of the present invention works well with SCR units in reducing the demands placed on the SCR, and reducing the amount of ammonia which must be injected, thus reducing the chances of exceeding ammonia emissions limits in the event of a plant upset.

The following section summarizes the suitable, preferred, and most preferred ranges of gas composition in various parts of the process.

| GAS STREAM COMPOSITION | | | | |
|---|---|---|---|---|
| | CO,% | O2,% | CO/O2 | HCN,ppm | NH3,ppm |

| | CO,% | O2,% | CO/O2 | HCN,ppm | NH3,ppm |
|---|---|---|---|---|---|
| FCC Regenerator Flue Gas Entering Flue Gas Line | | | | | |
| Good | 1+ | 0.1–2 | >1 | 10–5000 | 10–5000 |
| Better | 2–8 | 0.5–1 | 2–8 | 30–2000 | 30–2000 |
| Best | 2–6 | 0.75–2 | 2.5–6 | 50–500 | 50–500 |
| Entering CO Boiler | | | | | |
| Good | 0.5–10 | 0.1–5 | >1 * | <400 | <400 |
| Better | 0.75–7 | 0.35–2 | 1.5–8 | <50 | <50 |
| Best | 1.5–5 | 0.5–1 | 2–4 | <10 | <10 |
| Leaving CO Boiler | | | | | |
| Good | <200 | | | <200 | <200 |
| Better | <100 | | | <20 | <20 |
| Best | <30 | | | <5 | <5 |

* As it is possible for essentially all of the $O_2$ to be consumed in the homogeneous conversion step, the $CO/O_2$ ratio can approach infinity.

Gas compositions are only part of the process. Reaction conditions are also very important, in that if insufficient residence time is provided during the turbulent $NO_x$ precursor conversion process insufficient conversion may be observed.

| Conditions in Flue Gas Line: | | |
|---|---|---|
| | Temp, °F. | Time, s | NRe |
| Good | 1200–1800 | 0.5 + | Turbulent flow |
| Better | 1250–1600 | 0.5–2.5 | 50,000–1,000,000 |
| Best | 1300–1400 | 0.75–2 | 100,000–500,000 |

Some limits, such as the 10% CO content for the FCC regenerator, are somewhat beyond the CO levels experienced in commercial plants operating with air as the regeneration gas. The process of the present invention works well when much, or even all of the regeneration gas is oxygen, which can produce very high CO levels.

The process of the present invention provides a simple and robust way for refiners to crack nitrogen containing feedstocks while minimizing $NO_x$ emissions.

The process is especially attractive in that it does not rely on addition of ammonia or ammonia precursors such as urea to reduce the $NO_x$. Naturally occurring CO is the primary $NO_x$ reduction agent, and this material is already present in the FCC regenerator flue gas, and may reliably be removed in the downstream CO boiler. Under no circumstances will the process of the present invention release large amounts of ammonia to the atmosphere, which can happen if an ammonia injection system fails and adds excessive amounts of ammonia.

I claim:

1. A catalytic cracking process for cracking a nitrogen-containing hydrocarbon feed comprising:
   a. cracking said feed in a cracking reactor with a source of regenerated cracking catalyst to produce catalytically cracked products which are removed as a product and spent catalyst containing nitrogen-containing coke;
   b. regenerating said spent catalyst in a catalyst regenerator by contact with a controlled amount of air or oxygen-containing regeneration gas at regeneration conditions to produce regenerated catalyst which is recycled to said cracking reactor and regenerator flue gas;
   c. removing from the regenerator the regenerator flue gas stream comprising volatilized $NO_x$ precursors, at least 2.5 mole % carbon monoxide and more carbon monoxide than oxygen on a molar basis;
   d. adding air or oxygen containing gas to the regenerator flue gas flowing in a transfer line turbulent flow reactor operated between 1100° F. and 1800° F. and at a vapor velocity above 15 m/sec to produce oxygen enriched flue gas in turbulent flow;
   e. homogeneously converting at least 25 mole % of volatilized $NO_x$ precursors, but less than 75 mole % of said CO, in said oxygen enriched flue gas in said turbulent flow reactor to produce homogeneously converted flue gas containing CO and a reduced content of volatilized $NO_x$ precursors; and
   f. burning said homogeneously converted flue gas in a CO boiler operating at CO combustion conditions including the injection of a stoichiometric excess of oxygen or oxygen containing gas and a vapor velocity lower than said vapor velocity in said turbulent flow reactor to produce product gas with less than 0.5 mole % CO, more oxygen than CO, and a reduced $NO_x$ content as compared to the $NO_x$ content of a like regenerator flue gas burned in a CO boiler to a like CO and oxygen content.

2. The process of claim 1 wherein at least 90% of said volatilized $NO_x$ precursors are converted in said turbulent reaction zone and less than 40% of said volatilized $NO_x$ precursors are converted to $NO_x$.

3. The process of claim 1 wherein at least 90% of volatilzed $NO_x$ precursors are converted in said turbulent reaction zone and said converted flue gas stream contains at least 1.5 mole % CO.

4. The process of claim 1 wherein flowing vapor in said turbulent reaction zone has a Reynolds Number of 50,000 to 1,000,000.

5. The process of claim 1 wherein flowing vapor in said turbulent reaction zone has a Reynolds Number of 100,000 to 500,000, and wherein laminar flow conditions exist in at least a portion of said CO boiler.

6. The process of claim 1 wherein flow of air or oxygen containing gas to said turbulent flow reactor is controlled based on a differential temperature between said regenerator flue gas and temperature in said turbulent flow reactor downstream of air or oxygen containing gas addition.

7. The process of claim 6 wherein said differential temperature is 100° to 500° F.

8. A fluidized catalytic cracking process for cracking a nitrogen-containing hydrocarbon feed comprising:
   a. cracking said feed in a fluidized catalytic cracking (FCC) reactor with a source of regenerated cracking catalyst to produce catalytically cracked products which are removed as a product and spent catalyst containing nitrogen-containing coke;
   b. regenerating said spent catalyst in a bubbling fluidized bed catalyst regenerator with air or oxygen-containing regeneration gas at regeneration conditions to produce regenerated catalyst which is recycled to said cracking reactor and a regenerator flue gas;
   c. removing from said regenerator a regenerator flue gas stream having a temperature above 1250° F. and comprising:
      less than 0.5 mole % oxygen,
      at least 3.0 mole % carbon monoxide,
      at least 100 ppmv of HCN, or $NH_3$, or mixtures thereof;
   d. transporting said regenerator flue gas in a transfer line, turbulent flow reactor at conditions including a superficial vapor velocity above 20 m/s and adding air or oxygen-containing gas to said turbulent flow reactor and thermally converting at a temperature between 1250° F. and 1800° F. at least 90% of said total amount of said HCN and $NH_3$ but less than 50 mole % of said CO to produce converted flue gas having at least 1 mole % CO and a reduced $NO_x$ precursor content; and e. thermally converting in a downstream CO boiler operating at a reduced superficial vapor velocity said CO in said converted flue gas by adding oxygen or an oxygen containing gas to produce product gas with less than 0.1 mole % CO, excess oxygen, and a reduced $NO_x$ content compared to a like regenerator flue gas oxidized in a like CO boiler to said reduced CO content with an amount of oxygen or oxygen containing gas equal to that added to both said turbulent flow reactor and said CO boiler.

9. A fluidized catalytic cracking process for cracking a nitrogen-containing hydrocarbon feed comprising:

a. cracking said feed in a fluidized catalytic cracking reactor cracking catalyst to produce catalytically cracked products that are removed as a product and spent catalyst comprising nitrogen-containing coke;

b. regenerating said spent catalyst in a fluidized bed catalyst regenerator with air or oxygen-containing regeneration gas at regeneration conditions to produce regenerated catalyst, which is recycled to said cracking reactor, and regenerator flue gas stream;

c. removing the regenerator flue gas stream from the regenerator, the flue gas stream having a temperature above 1250° F. and comprising:
 less than 0.5 mole % oxygen,
 at least 2.5 mole % carbon monoxide,
 at least 100 ppmv of HCN, or $NH_3$, or mixtures thereof;

d. transporting said flue gas stream in a transfer line, turbulent flow reactor at conditions including a superficial vapor velocity above 20 m/s and adding air or oxygen-containing gas to said turbulent flow reactor and thermally converting, in the absence of a catalyst, at a temperature between 1250° F. and 1800° F., at least 80% of said total amount of said HCN and $NH_3$ but less than 50 mole % of said CO; and e. thermally converting said CO in said converted flue gas in a downstream CO boiler operating at a reduced superficial vapor velocity by adding oxygen or an oxygen-containing gas to produce product gas with less than 0.1 mole % CO.

10. The process of claim 9 wherein at least 90% of said total amount of said HCN and $NH_3$ is converted within the turbulent flow reactor.

* * * * *